US012307966B2

(12) United States Patent
Li et al.

(10) Patent No.: US 12,307,966 B2
(45) Date of Patent: May 20, 2025

(54) PIXEL CIRCUIT, DISPLAY PANEL, DRIVING METHOD AND DISPLAY DEVICE

(71) Applicants: Yunnan Invensight Optoelectronics Technology Co., Ltd., Yunnan (CN); BOE TECHNOLOGY GROUP CO., LTD, Beijing (CN)

(72) Inventors: Dachao Li, Beijing (CN); Shengji Yang, Beijing (CN); Xiaochuan Chen, Beijing (CN); Zhijian Zhu, Beijing (CN); Junyan Yang, Beijing (CN)

(73) Assignees: YUNNAN INVENSIGHT OPTOELECTRONICS TECHNOLOGY CO., LTD., Yunnan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/257,837

(22) PCT Filed: Jun. 24, 2022

(86) PCT No.: PCT/CN2022/101157

§ 371 (c)(1),
(2) Date: Jun. 15, 2023

(87) PCT Pub. No.: WO2023/231097

PCT Pub. Date: Dec. 7, 2023

(65) Prior Publication Data

US 2024/0386846 A1 Nov. 21, 2024

(30) Foreign Application Priority Data

May 31, 2022 (WO) ................ PCT/CN2022/096196
Jun. 10, 2022 (WO) ................ PCT/CN2022/098080

(51) Int. Cl.
*G09G 3/3233* (2016.01)

(52) U.S. Cl.
CPC ... *G09G 3/3233* (2013.01); *G09G 2300/0426* (2013.01); *G09G 2300/0465* (2013.01);
(Continued)

(58) Field of Classification Search
CPC ......... G09G 3/3233; G09G 2300/0426; G09G 2300/0465; G09G 2300/0819;
(Continued)

(56) References Cited

U.S. PATENT DOCUMENTS 10,417,972 B1 9/2019 Cheng et al.
2005/0162356 A1 7/2005 Koyama et al.
(Continued)

FOREIGN PATENT DOCUMENTS

CN 1848221 A 10/2006
CN 1862643 A 11/2006
(Continued)

OTHER PUBLICATIONS

Nonfinal Rejection for copending U.S. Appl. No. 18/262,699, dated Oct. 8, 2024, 16 Pages.
(Continued)

*Primary Examiner* — Kenneth B Lee, Jr.
(74) *Attorney, Agent, or Firm* — BROOKS KUSHMAN P.C.

(57) ABSTRACT

A pixel circuit includes a light emitting element, a driving circuit, a first energy storage circuit, a second energy storage circuit, and a writing-in-in control circuit and a first control circuit; a first terminal of the first energy storage circuit is electrically connected to a control terminal of the driving circuit, and a second terminal of the first energy storage circuit is electrically connected to a first terminal of the driving circuit; a first terminal of the second energy storage circuit is electrically connected to a control terminal of the driving circuit; the writing-in control circuit is configured to
(Continued)

control to connect or disconnect the writing-in terminal and the second terminal of the second energy storage circuit under the control of the first writing-in control signal provided by the first writing-in control terminal.

18 Claims, 7 Drawing Sheets

(52) U.S. Cl.
CPC ............... *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/045* (2013.01); *G09G 2330/02* (2013.01)

(58) Field of Classification Search
CPC ... G09G 2300/0852; G09G 2300/0861; G09G 2310/08; G09G 2320/0233; G09G 2320/045; G09G 2330/02
See application file for complete search history.

(56) References Cited

U.S. PATENT DOCUMENTS

| | | | |
|---|---|---|---|
| 2006/0256058 | A1 | 11/2006 | Asano et al. |
| 2013/0063413 | A1 | 3/2013 | Miyake |
| 2013/0093653 | A1 | 4/2013 | Ota et al. |
| 2013/0215158 | A1 | 8/2013 | Fujita et al. |
| 2014/0285411 | A1 | 9/2014 | Tamura et al. |
| 2015/0213758 | A1 | 7/2015 | Araki |
| 2016/0307499 | A1 | 10/2016 | Toyomura et al. |
| 2018/0130412 | A1 | 5/2018 | Zhang et al. |
| 2020/0342812 | A1 | 10/2020 | Xu |
| 2022/0376024 | A1* | 11/2022 | Zheng ................ H10K 59/1216 |
| 2023/0028312 | A1* | 1/2023 | Wang ................... G09G 3/3258 |
| 2023/0031984 | A1 | 2/2023 | Wang et al. |
| 2023/0052846 | A1* | 2/2023 | Zheng ................ H10K 59/1216 |

FOREIGN PATENT DOCUMENTS

| | | | |
|---|---|---|---|
| CN | 101536070 | A | 9/2009 |
| CN | 103065582 | A | 4/2013 |
| CN | 104064581 | A | 9/2014 |
| CN | 104821150 | A | 8/2015 |
| CN | 107767818 | A | 3/2018 |
| CN | 108932929 | A | 12/2018 |
| CN | 110634902 | A | 12/2019 |
| CN | 104871233 | B | 2/2020 |
| CN | 107665669 | B | 11/2020 |
| CN | 112053661 | A | 12/2020 |
| CN | 113950715 | A | 1/2022 |
| CN | 111063304 | A | 4/2024 |
| JP | 2012255872 | A | 12/2012 |

OTHER PUBLICATIONS

Extended European Search Report for Application No. 22944415.3, dated Jan. 16, 2025, 4 Pages.

* cited by examiner

PIXEL CIRCUIT, DISPLAY PANEL, DRIVING METHOD AND DISPLAY DEVICE

CROSS-REFERENCE TO RELATED APPLICATIONS

This application is the U.S. national phase of PCT/CN2022/101157 filed on Jun. 24, 2022, which claims priority to PCT Application No. PCT/CN2022/098080 filed on Jun. 10, 2022, and PCT Application No. PCT/CN2022/096196 filed on May 31, 2022, which are incorporated herein by reference in their entireties.

TECHNICAL FIELD

The present disclosure relates to the field of display technology, in particular to a pixel circuit, a display panel, a driving method and a display device.

BACKGROUND

Organic Light Emitting Diode (OLED) display is one of the hotspots in the field of flat panel display, and pixel circuit design is the core technical content of OLED display. In the related art, a current-type pixel circuit capable of threshold voltage self-compensation and applied to an OLED display cannot be provided.

SUMMARY

In one aspect, the present disclosure provides in some embodiments a pixel circuit, including a light emitting element, a driving circuit, a first energy storage circuit, a second energy storage circuit, a writing-in control circuit and a first control circuit; wherein a first terminal of the first energy storage circuit is electrically connected to a control terminal of the driving circuit, and a second terminal of the first energy storage circuit is electrically connected to a first terminal of the driving circuit; the first energy storage circuit is used to store electrical energy; a first terminal of the second energy storage circuit is electrically connected to a control terminal of the driving circuit; the second energy storage circuit is used to store electric energy; the writing-in control circuit is electrically connected to a first writing-in control terminal, a writing-in terminal and a second terminal of the second energy storage circuit respectively, is configured to control to connect or disconnect the writing-in terminal and the second terminal of the second energy storage circuit under the control of the first writing-in control signal provided by the first writing-in control terminal; the first control circuit is electrically connected to a first control terminal, a power supply voltage terminal and a first terminal of the driving circuit, and is used to control to connect or disconnect the power supply voltage terminal and the first terminal of the driving circuit under the control of a first control signal provided by the first control terminal; a second terminal of the driving circuit is electrically connected to the light emitting element, and the driving circuit is configured to generate a driving current for driving the light emitting element under the control of a potential of the control terminal of the driving circuit.

Optionally, the first control circuit is configured to control to connect the power supply voltage terminal and the first terminals of the driving circuit in two discontinues phases in one display period under the control of the first control signal.

Optionally, a display period of the pixel circuit may include an initialization phase, a self-discharge phase, a data preparation phase, a data writing-in phase, and a light emitting phase that are set successively; the first control circuit is configured to control to connect the power supply voltage terminal and the first terminal of the driving circuit in the initialization phase, the data preparation phase, the data writing-in phase and the light emitting phase, control to disconnect the power supply voltage terminal from the first terminal of the driving circuit in the self-discharging phase under the control of the first control signal.

Optionally, the writing-in control circuit is configured to control to disconnect the writing-in terminal from the second terminal of the second energy storage circuit in the initialization phase, the data preparation phase and the light emitting phase under the control of the first writing-in control signal, control to connect the writing-in terminal and the second terminal of the second energy storage in the self-discharging phase and the data writing-in phase under the control of the first writing-in control signal.

Optionally, the pixel circuit further includes a reference voltage writing-in circuit; wherein the reference voltage writing-in circuit is electrically connected to a second writing-in control terminal, a reference voltage terminal and the control terminal of the driving circuit respectively, and is configured to write a reference voltage provided by the reference voltage terminal into the control terminal of the driving circuit under the control of a second writing-in control signal provided by the second writing-in control terminal.

Optionally, the pixel circuit further includes a second control circuit; wherein the second terminal of the driving circuit is electrically connected to the first electrode of the light emitting element, and the second electrode of the light emitting element is electrically connected to the first voltage terminal; the second control circuit is electrically connected to a second control terminal, a reset voltage terminal and the first electrode of the light emitting element, and is configured to control to write a reset voltage provided by the reset voltage terminal into the first electrode of the light emitting element under the control of a second control signal provided by the second control terminal.

Optionally, the pixel circuit further includes a resistor circuit; wherein the second terminal of the driving circuit is electrically connected to the first electrode of the light emitting element through the resistor circuit, the second electrode of the light emitting element is electrically connected to the first voltage terminal.

Optionally, the first energy storage circuit comprises a first capacitor; the second energy storage circuit comprises a second capacitor; the writing-in control circuit includes a first transistor; a first terminal of the first capacitor is electrically connected to the control terminal of the driving circuit, and a second terminal of the first capacitor is electrically connected to the first terminal of the driving circuit; a first terminal of the second capacitor is electrically connected to the control terminal of the driving circuit; a control electrode of the first transistor is electrically connected to the first writing-in control terminal, a first electrode of the first transistor is electrically connected to the writing-in terminal, and a second electrode of the first transistor is electrically connected to the second terminal of the second capacitor; a back gate electrode of the first transistor is electrically connected to the second voltage terminal.

Optionally, the first control circuit comprises a second transistor; the driving circuit comprises a driving transistor;

a control electrode of the second transistor is electrically connected to the first control terminal, a first electrode of the second transistor is electrically connected to the power supply voltage terminal, and a second electrode of the second transistor is electrically connected to the first terminal of the driving transistor; a back gate electrode of the second transistor is electrically connected to the second voltage terminal; a control electrode of the driving transistor is the control terminal of the driving circuit, a first electrode of the driving transistor is the first terminal of the driving circuit, and a second electrode of the driving transistor is the second terminal of the driving circuit; a back gate electrode of the driving transistor is electrically connected to the second voltage terminal.

Optionally, the reference voltage writing-in circuit comprises a third transistor; a control electrode of the third transistor is electrically connected to the second writing-in control terminal, a first electrode of the third transistor is electrically connected to the reference voltage terminal, and a second electrode of the third transistor is electrically connected to the control terminal of the driving circuit; a back gate electrode of the third transistor is electrically connected to the second voltage terminal.

Optionally, the second control circuit comprises a fourth transistor; a control electrode of the fourth transistor is electrically connected to the second control terminal, a first electrode of the fourth transistor is electrically connected to the reset voltage terminal, and a second electrode of the fourth transistor is electrically connected to the first electrode of the light emitting element; a back gate electrode of the fourth transistor is electrically connected to a third voltage terminal.

Optionally, the fourth transistor is an n-type transistor, and the third voltage terminal is the reset voltage terminal; or, the fourth transistor is a p-type transistor, and the third voltage terminal is the second voltage terminal.

Optionally, the fourth transistor is an n-type transistor; a deep n hydrazine is provided between the back gate electrode of the fourth transistor and a P-type substrate to isolate the back gate electrode of the fourth transistor from the P-type base substrate; the base gate electrode and the first electrode of the fourth transistors are all electrically connected to the reset voltage terminal.

Optionally, the pixel circuit further includes an n hydrazine and a p hydrazine; wherein a doping concentration of the n hydrazine is greater than a doping concentration of the deep n hydrazine; a ratio of a thickness of the n hydrazine to a thickness of the deep n hydrazine is greater than or equal to 0.4 and less than or equal to 0.6; a ratio of a thickness of the p hydrazine to the thickness of the deep n hydrazine is greater than or equal to 0.4 and less than or equal to 0.6.

In a second aspect, an embodiment of the present disclosure provides a display panel including a plurality of rows and a plurality of columns of the pixel circuits.

In a third aspect, an embodiment of the present disclosure provides a driving method applied to the pixel circuit, wherein the driving method comprises: controlling, by the writing-in control circuit, to connect or disconnect the writing-in terminal and the second terminal of the second energy storage circuit under the control of the first writing-in control signal; controlling, by the first control circuit, to connect or disconnect the power supply voltage terminal and the first terminal of the driving circuit under the control of the first control signal; generating, by the driving circuit, a driving current for driving the light emitting element under the control of a potential of the control terminal of the driving circuit.

Optionally, the driving method comprises: in one display period, in two discontinuous phases, controlling, by the first control circuit, to connect the power supply voltage terminal and the first terminal of the driving circuit under the control of the first control signal.

Optionally, the display period of the pixel circuit includes an initialization phase, a self-discharge phase, a data preparation phase, a data writing-in phase, and a light emitting phase that are set successively; the driving method comprises: in the initialization phase, the data preparation phase, the data writing-in phase and the light emitting phase, controlling, by the first control circuit, to connect the power supply voltage terminal and the first terminal of the driving circuit under the control of the first control signal; in the self-discharging phase, controlling, by the first control circuit, to disconnect the power supply voltage terminal from the first terminal of the driving circuit under the control of the first control signal.

Optionally, the display period of the pixel circuit includes an initialization phase, a self-discharge phase, a data preparation phase, a data writing-in phase, and a light emitting phase that are set successively; the driving method includes: in the initialization phase, the data preparation phase, and the light emitting phase, controlling, by the writing-in control circuit, to disconnect the writing-in terminal from the second terminal of the second energy storage circuit under the control of the first writing-in control signal; in the self-discharging phase and the data writing-in phase, controlling, by the writing-in control circuit, to connect the writing-in terminal and the second terminal of the second energy storage circuit under the control of the first writing-in control signal.

In a fourth aspect, an embodiment of the present disclosure provides a display device comprising the display panel.

Optionally, the display panel comprises a first silicon substrate, and the pixel circuit and a gate driving circuit arranged on the first silicon substrate; the display device further includes a second silicon substrate, and a display driver chip arranged on the second silicon substrate.

Optionally, an area of the first silicon substrate is larger than an area of the second silicon substrate; a minimum width of a signal line included in the display panel is greater than a width of a signal line included in the display driver chip.

DETAILED DESCRIPTION

Figure 1:
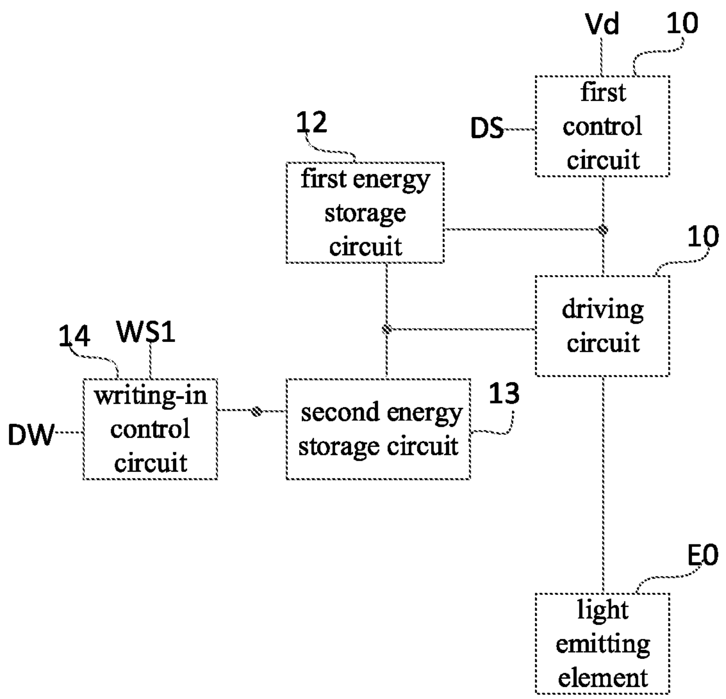
FIG. 1 is a structural diagram of a pixel circuit according to at least one embodiment of the present disclosure.

The following will clearly and completely describe the technical solutions in the embodiments of the present disclosure with reference to the accompanying drawings in the embodiments of the present disclosure. Apparently, the described embodiments are only some of the embodiments of the present disclosure, not all of them. Based on the embodiments in the present disclosure, all other embodiments obtained by persons of ordinary skill in the art without making creative work belong to the protection scope of the present disclosure.

The transistors used in all embodiments of the present disclosure may be thin film transistors or field effect transistors or other devices with the same characteristics. In the embodiments of the present disclosure, in order to distinguish the two electrodes of the transistor other than the gate electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

The pixel circuit described in the embodiment of the present disclosure includes a light emitting element, a driving circuit, a first energy storage circuit, a second energy storage circuit, a writing-in control circuit and a first control circuit;

A first terminal of the first energy storage circuit is electrically connected to a control terminal of the driving circuit, and a second terminal of the first energy storage circuit is electrically connected to a first terminal of the driving circuit; the first energy storage circuit is used to store electrical energy;

A first terminal of the second energy storage circuit is electrically connected to a control terminal of the driving circuit; the second energy storage circuit is used to store electric energy;

The writing-in control circuit is electrically connected to a first writing-in control terminal, a writing-in terminal and a second terminal of the second energy storage circuit respectively, is configured to control to connect or disconnect the writing-in terminal and the second terminal of the second energy storage circuit under the control of the first writing-in control signal provided by the first writing-in control terminal;

The first control circuit is electrically connected to a first control terminal, a power supply voltage terminal and a first terminal of the driving circuit, and is used to control to connect or disconnect the power supply voltage terminal and the first terminal of the driving circuit under the control of the first control signal provided by the first control terminal;

A second terminal of the driving circuit is electrically connected to the light emitting element, and the driving circuit is used to generate a driving current for driving the light emitting element under the control of a potential of the control terminal of the driving circuit.

When the pixel circuit described in the embodiments of the present disclosure is working, the writing-in control circuit controls to write the voltage signal provided by the writing-in terminal into the second terminal of the second energy storage circuit under the control of the first writing-in control signal; the first control circuit controls to connect or disconnect the power supply voltage terminal and the first terminal of the driving circuit under the control of the first control signal, so as to control the self-discharge threshold compensation process of the driving transistor included in the driving circuit; the first energy storage circuit and the second energy storage circuit can control the potential of the control terminal of the driving circuit by dividing the voltage; the driving circuit generates a driving current for driving the light emitting element under the control of the potential of the control terminal of the driving circuit.

When the pixel circuit described in the embodiments of the present disclosure is in operation, the capacitance value of the first capacitor included in the first energy storage circuit and the capacitance value of the second capacitor included in the second energy storage circuit can be adjusted, so as to control that the driving current for controlling the driving circuit to drive the light emitting element to emit light is not related to the threshold voltage of the driving transistor included in the driving circuit.

The embodiments of the present disclosure can provide a current-type pixel circuit with a simple structure and capable of threshold voltage self-compensation, which is applied to an OLED display.

In at least one embodiment of the present disclosure, the first control circuit may be used to control to connect the power supply voltage terminal and the first terminals of the driving circuit in two discontinues phases in one display period under the control of the first control signal.

When the pixel circuit described in the embodiments of the present disclosure is working, the display period of the pixel circuit may include an initialization phase, a self-discharge phase, a data preparation phase, a data writing-in phase, and a light emitting phase, which are set successively;

The first control circuit is used to control to connect the power supply voltage terminal and the first terminals of the driving circuit in the initialization phase, the data preparation phase, the data writing-in phase and the light emitting phase, control to disconnect the power supply voltage terminal from the first terminal of the driving circuit in the self-discharging phase under the control of the first control signal.

In at least one embodiment of the present disclosure, the two discontinuous phases may be respectively: the initialization phase and the self-discharge phase, but not limited thereto.

When the pixel circuit described in the embodiments of the present disclosure is working, the display period of the pixel circuit may include an initialization phase, a self-discharge phase, a data preparation phase, a data writing-in phase, and a light emitting phase, which are set successively;

The writing-in control circuit is used to control to disconnect the writing-in terminal from the second terminal of the second energy storage circuit in the initialization phase, the data preparation phase and the light emitting phase under the control of the first writing-in control signal, control to connect the writing-in terminal and the second terminal of the second energy storage in the self-discharging phase and the data writing-in phase under the control of the first writing-in control signal.

As shown in FIG. 1, the pixel circuit described in at least one embodiment of the present disclosure includes a light emitting element E0, a first control circuit 10, a driving circuit 11, a first energy storage circuit 12, a second energy storage circuit 13, and a writing-in control circuit 14;

The first control circuit 10 is electrically connected to the first control terminal DS, the power supply voltage terminal Vd, and the first terminal of the driving circuit 11, respectively, is configured to control to connect or disconnect the power supply voltage terminal Vd and the first terminal of the driving circuit 11 under the control of the first control signal provided at the first control terminal DS; the power supply voltage terminal Vd is used to provide a power supply voltage;

The first terminal of the first energy storage circuit 12 is electrically connected to the control terminal of the driving circuit 11, and the second terminal of the first energy storage circuit 12 is electrically connected to the first terminal of the driving circuit 11; the first energy storage circuit 12 is used to store electric energy;

The first terminal of the second energy storage circuit 13 is electrically connected to the control terminal of the driving circuit 11;

The writing-in control circuit 14 is electrically connected to the first writing-in control terminal WS1, the writing-in terminal DW, and the second terminal of the second energy storage circuit 13, respectively, is configured to control to connect or disconnect the writing-in terminal DW and the second terminal of the second energy storage circuit 13 under the control of the first writing-in control signal provided by the first writing-in control terminal WS1;

The second terminal of the driving circuit 11 is electrically connected to the light emitting element E0, and the driving circuit 11 is used to generate a driving current to drive the light emitting element E0 under the control of the potential of the control terminal of the driving circuit.

When at least one embodiment of the pixel circuit shown in FIG. 1 of the present disclosure is working, the writing-in control circuit 14 transmits the voltage signal provided by the writing-in terminal DW under the control of the first writing-in control signal; the first energy storage circuit 12 is used to store data voltage and control the gate-source voltage of the driving transistor included in the driving circuit 11; the first control circuit 10 can control the self-discharge threshold compensation process of the driving transistor included in the driving circuit 11.

In at least one embodiment of the pixel circuit shown in FIG. 1 of the present disclosure, when the data voltage is written and divided by the first energy storage circuit 12 and the second energy storage circuit 13, which expands the dynamic range of the data voltage. It is beneficial to the design of the DAC in the source driver and the uniformity of the data line output.

When at least one embodiment of the pixel circuit shown in FIG. 1 of the present disclosure is in operation, the display period includes an initialization phase, a self-discharge phase, a data preparation phase, a data writing-in phase, and a light emitting phase that are set successively;

In the initialization phase, the data preparation phase, the data writing-in phase, and the light emitting phase, the first control circuit 10 controls to connect the power supply voltage terminal Vd and the first terminal of the driving circuit 11 under the control of the first control signal;

In the self-discharging phase, the first control circuit 10 controls to disconnect the power supply voltage terminal Vd from the first terminal of the driving circuit 11 under the control of the first control signal;

In the initialization phase, the data preparation phase, and the light emitting phase, the writing-in control circuit 14 controls to disconnect the writing-in terminal DW and the second terminal of the second storage device under the control of the first writing-in control signal;

In the self-discharging phase and the data writing-in phase, the writing-in control circuit 10 controls to connect the writing-in terminal DW and the second terminal of the second energy storage circuit 13 under the control of the first writing-in control signal.

The pixel circuit described in at least one embodiment of the present disclosure may further include a reference voltage writing-in circuit;

The reference voltage writing-in circuit is electrically connected to a second writing-in control terminal, a reference voltage terminal and the control terminal of the driving circuit respectively, and is configured to write the reference voltage provided by the reference voltage terminal into the control terminal of the driving circuit under the control of the second writing-in control signal provided by the second writing-in control terminal.

In specific implementation, the pixel circuit may also include a reference voltage writing-in circuit, the reference voltage writing-in circuit writes the reference voltage into the control terminal of the driving circuit under the control of the second writing-in control signal, so as to control the driving transistor included in the driving circuit to be turned on and off.

In at least one embodiment of the present disclosure, the pixel circuit further includes a second control circuit; the second terminal of the driving circuit is electrically connected to the first electrode of the light emitting element, and the second electrode of the light emitting element is electrically connected to the first voltage terminal;

The second control circuit is electrically connected to a second control terminal, a reset voltage terminal and the first electrode of the light emitting element, and is used to control to write the reset voltage provided by the reset voltage terminal into the first electrode of the light emitting element under the control of the second control signal provided by the second control terminal.

During specific implementation, the second control circuit is used to write the reset voltage into the first electrode of the light emitting element during the non-light emitting phase under the control of the second control signal, so that the difference between the potential of the first electrode of the light emitting element and the potential of the second electrode of the light emitting element is smaller than the turn-on voltage of the light emitting element, so as to control the light emitting element not to emit light.

Optionally, the light emitting element may be an organic light emitting diode, the first electrode of the light emitting element is the anode of the organic light emitting diode, and the second electrode of the light emitting element is the cathode of the organic light emitting diode, but is not limited.

Figure 2:
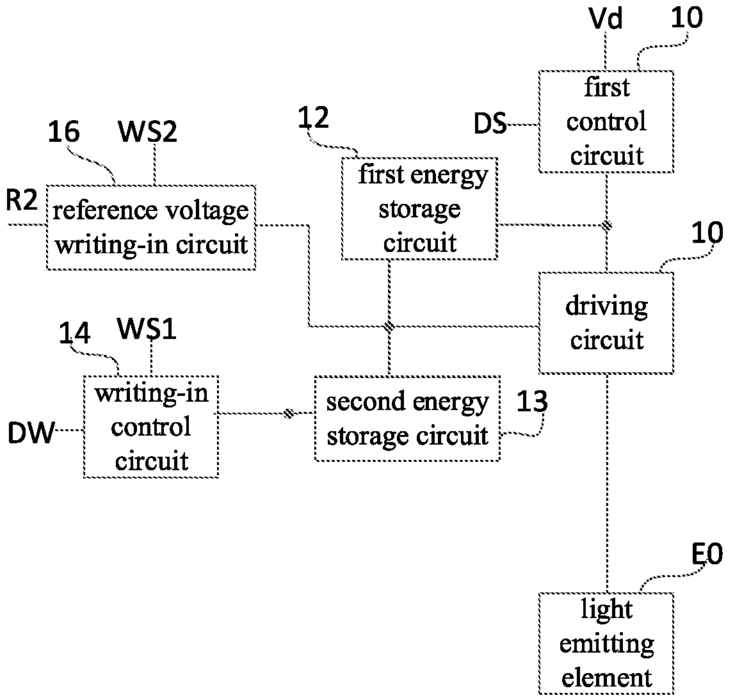
FIG. 2 is a structural diagram of a pixel circuit according to at least one embodiment of the present disclosure.

As shown in FIG. 2, on the basis of at least one embodiment of the pixel circuit shown in FIG. 1, the pixel circuit described in at least one embodiment of the present disclosure may further include a reference voltage writing-in circuit 16;

The reference voltage writing-in circuit 16 is electrically connected to the second writing-in control terminal WS2, the reference voltage terminal R2 and the control terminal of the driving circuit 11, respectively, is configured to write the reference voltage Vref provided by the reference voltage terminal R2 into the control terminal of the driving circuit 11 under the control of the second writing-in control signal provided by the second writing-in control terminal WS2.

When at least one embodiment of the pixel circuit shown in FIG. 2 of the present disclosure is in operation, the display period includes an initialization phase, a self-discharge phase, a data preparation phase, a data writing-in phase, and a light emitting phase that are set successively;

In the initialization phase and the self-discharge phase, the reference voltage writing-in circuit 16 writes the reference voltage Vref provided by the reference voltage terminal R2 into the drive under the control of the second writing-in control signal;

In the data preparation phase, the data writing-in phase and the light emitting phase, the reference voltage writing-in circuit 16 controls to disconnect the reference voltage terminal R2 and the control terminal of the driving circuit 11 under the control of the second writing-in control signal.

Figure 3:
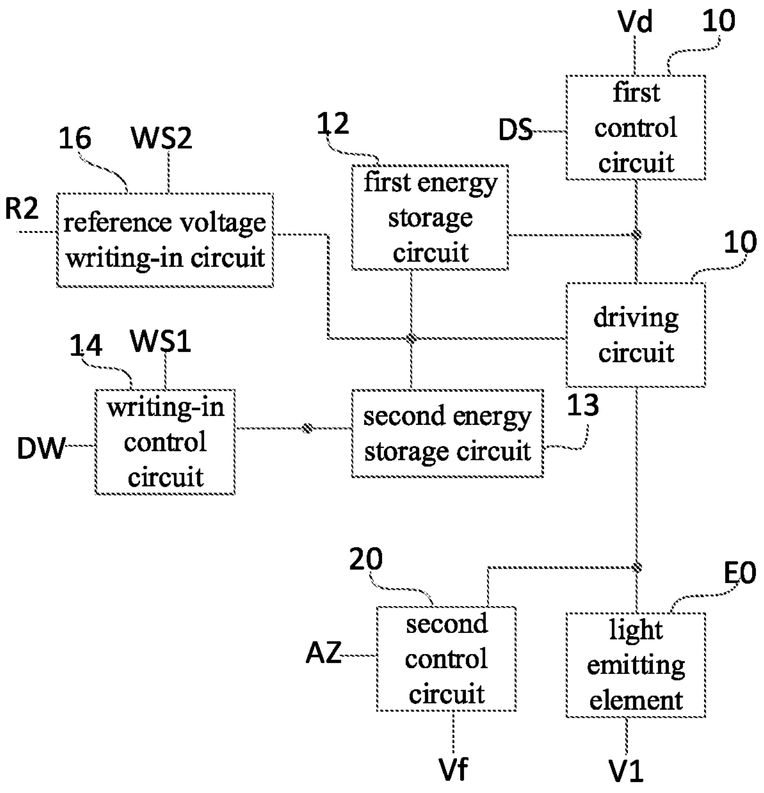
FIG. 3 is a circuit diagram of a pixel circuit according to at least one embodiment of the present disclosure.

As shown in FIG. 3, on the basis of at least one embodiment of the pixel circuit shown in FIG. 2, the pixel circuit described in at least one embodiment of the present disclosure may further include a second control circuit 20;

The second terminal of the driving circuit 11 is electrically connected to the first electrode of the light emitting element E0, and the second electrode of the light emitting element E0 is electrically connected to the first voltage terminal V1;

The second control circuit 20 is electrically connected to the second control terminal AZ, the reset voltage terminal Vf and the first electrode of the light emitting element E0 respectively, and is configured to write the reset voltage provided by the reset voltage terminal Vf into the first electrode of the light emitting element E0 under the control of the second control signal provided by the second control terminal AZ.

When at least one embodiment of the pixel circuit shown in FIG. 3 of the present disclosure is working, the second control circuit 20 is used to write the reset voltage provided by the reset voltage terminal Vf into the first electrode of the light emitting element E0 in the non-light emitting phase under the control of the second control signal, so that the difference between the potential of the first electrode of the light emitting element E0 and the potential of the second electrode of the light emitting element E0 is smaller than the turn-on voltage of the light emitting element E0, to control the light emitting element E0 not to emit light.

In at least one embodiment of the pixel circuit shown in FIG. 3 of the present disclosure, the first voltage terminal V1 may be connected to the common electrode voltage Vcom, but not limited thereto.

In at least one embodiment of the present disclosure, Vcom may be greater than or equal to −12V and less than or equal to −9V, but not limited thereto.

Optionally, the pixel circuit described in at least one embodiment of the present disclosure may further include a resistor circuit; the second terminal of the driving circuit is electrically connected to the first electrode of the light emitting element through the resistor circuit, so as to prevent the a short circuit between the first electrode of the light emitting element and the second electrode of the light emitting element;

The second electrode of the light emitting element is electrically connected to the first voltage terminal.

Figure 4:
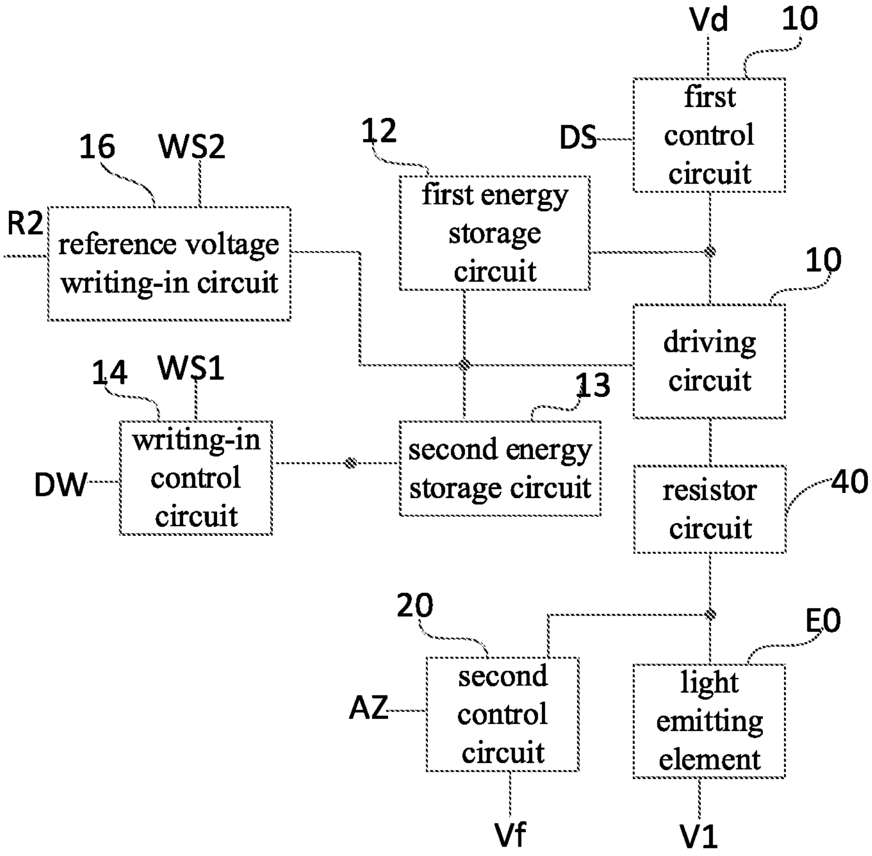
FIG. 4 is a circuit diagram of a pixel circuit according to at least one embodiment of the present disclosure.

As shown in FIG. 4, on the basis of at least one embodiment of the pixel circuit shown in FIG. 3, the pixel circuit described in at least one embodiment of the present disclosure may further include a resistor circuit 40; the second terminal of the driving circuit 11 is electrically connected to the first electrode of the light emitting element E0 through the resistor circuit 40.

In at least one embodiment of the present disclosure, the resistor circuit may be made of the same material as the gate electrode of the driving transistor included in the driving circuit, for example, the material may be polysilicon, and the conductivity of the resistor circuit is against the conductivity of the gate electrode of the driving transistor; but not limited thereto.

In at least one embodiment of the present disclosure, the resistor circuit 40 may include a first resistor, the first terminal of the first resistor is electrically connected to the second terminal of the driving circuit 11, and the second terminal of the first resistor terminal may be electrically connected to the first electrode of the light emitting element E0, but not limited thereto.

Optionally, the first energy storage circuit includes a first capacitor; the second energy storage circuit includes a second capacitor; the writing-in control circuit includes a first transistor;

A first terminal of the first capacitor is electrically connected to the control terminal of the driving circuit, and a second terminal of the first capacitor is electrically connected to the first terminal of the driving circuit;

A first terminal of the second capacitor is electrically connected to the control terminal of the driving circuit;

A control electrode of the first transistor is electrically connected to the first writing-in control terminal, a first electrode of the first transistor is electrically connected to the writing-in terminal, and a second electrode of the first transistor is electrically connected to the second terminal of the second capacitor; a back gate electrode of the first transistor is electrically connected to the second voltage terminal.

In at least one embodiment of the present disclosure, the capacitance value of the second capacitor may be smaller than the capacitance value of the first capacitor, but not limited thereto.

Optionally, the first control circuit includes a second transistor; the driving circuit includes a driving transistor;

A control electrode of the second transistor is electrically connected to the first control terminal, a first electrode of the second transistor is electrically connected to the power supply voltage terminal, and a second electrode of the second transistor is electrically connected to the first terminal of the driving transistor; a back gate electrode of the second transistor is electrically connected to the second voltage terminal;

The control electrode of the driving transistor is the control terminal of the driving circuit, the first electrode of the driving transistor is the first terminal of the driving circuit, and the second electrode of the driving transistor is the second terminal of the driving circuit; the back gate electrode of the driving transistor is electrically connected to the second voltage terminal.

Optionally, the reference voltage writing-in circuit includes a third transistor;

A control electrode of the third transistor is electrically connected to the second writing-in control terminal, a first electrode of the third transistor is electrically connected to the reference voltage terminal, and a second electrode of the third transistor is electrically connected to the control terminal of the driving circuit; a back gate electrode of the third transistor is electrically connected to the second voltage terminal.

Optionally, the second control circuit includes a fourth transistor;

A control electrode of the fourth transistor is electrically connected to the second control terminal, a first electrode of the fourth transistor is electrically connected to the reset voltage terminal, and a second electrode of the fourth transistor is electrically connected to the first electrode of the light emitting element; a back gate electrode of the fourth transistor is electrically connected to the third voltage terminal.

In at least one embodiment of the present disclosure, the fourth transistor may be an n-type transistor, and the third voltage terminal is the reset voltage terminal; or, The fourth transistor may be a p-type transistor, and the third voltage terminal is a second voltage terminal.

Figure 5:
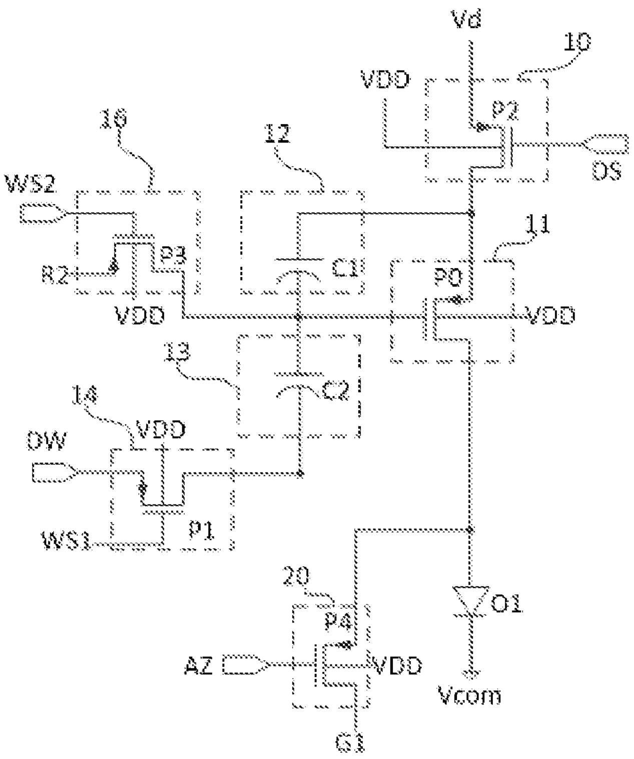
FIG. 5 is a circuit diagram of a pixel circuit according to at least one embodiment of the present disclosure.

As shown in FIG. 5, on the basis of at least one embodiment of the pixel circuit shown in FIG. 3, The first energy storage circuit 12 includes a first capacitor C1; the second energy storage circuit 13 includes a second capacitor C2; the writing-in control circuit 14 includes a first transistor P1; the driving circuit 11 includes a driving transistor P0, the first control circuit 10 includes a second transistor P2; the second control circuit 20 includes a fourth transistor P4; the reference voltage writing-in circuit 16 includes a third transistor P3; the light emitting element is an organic light emitting diode O1;

The first terminal of the first capacitor C1 is electrically connected to the gate electrode of the driving transistor P0, and the second terminal of the first capacitor C1 is electrically connected to the source electrode of the driving transistor P0;

The first terminal of the second capacitor C2 is electrically connected to the gate electrode of the driving transistor P0;

The gate electrode of the first transistor P1 is electrically connected to the first writing-in control terminal WS1, the source electrode of the first transistor P1 is electrically connected to the writing-in terminal DW, and the drain electrode of the first transistor P1 is electrically connected to the second terminal of the second capacitor C2; the back gate electrode of the first transistor P1 is electrically connected to a high voltage terminal; the high voltage terminal is used to provide a high voltage VDD;

The gate electrode of the third transistor P3 is electrically connected to the second writing-in control terminal WS2, the source electrode of the third transistor P3 is electrically connected to the reference voltage terminal R2, and the drain electrode of the third transistor P3 is electrically connected to the gate electrode of the driving transistor P0; the back gate electrode of the third transistor is electrically connected to the high voltage terminal; the reference voltage terminal R2 is used to provide a reference voltage Vref;

The gate electrode of the second transistor P2 is electrically connected to the first control terminal DS, the source electrode of the second transistor P2 is electrically connected to the power supply voltage terminal Vd, and the drain electrode of the second transistor P2 is electrically connected to the source electrode of the driving transistor P0; the back gate electrode of the second transistor P2 is electrically connected to the high voltage terminal; the power supply voltage terminal Vd is used to provide a power supply voltage ELVDD;

The gate electrode of the fourth transistor P4 is electrically connected to the second control terminal AZ, the source electrode of the fourth transistor P4 is electrically connected to the ground terminal G1, and the drain electrode of the fourth transistor P4 is electrically connected to the anode of the organic light emitting diode O1; the back gate electrode of the fourth transistor P4 is electrically connected to the high voltage terminal;

The cathode of the OLED O1 is connected to the common electrode voltage Vcom.

In at least one embodiment of the present disclosure, the first transistor P1, the second capacitor C2 and the fourth transistor P4 may be arranged outside the display area, and the driving transistor P0, the second transistor P2, the third transistor P3 and the first capacitor C1 may be arranged in the display area, but not limited thereto.

In at least one embodiment of the pixel circuit shown in FIG. 5, the third voltage terminal is the high voltage terminal, the first voltage terminal is connected to the common electrode voltage Vcom, and the reset voltage terminal is the ground terminal G1.

In at least one embodiment of the present disclosure, ELVDD-Vref is greater than or equal to 1.5V, and the value range of ELVDD may be greater than or equal to 2V and less than or equal to 8V, but it is not limited thereto.

In at least one embodiment of the pixel circuit shown in FIG. 5, all transistors are PMOS transistors, but not limited thereto.

In at least one embodiment of the pixel circuit shown in FIG. 5 of the present disclosure, the driving transistor P0 is equivalent to a current source controlled by the gate voltage, so that the data voltage Vdata directly controls the driving current flowing through O1, so the pixel circuit shown in FIG. 5 of at least one embodiment of the present disclosure is a current-type pixel circuit.

In at least one embodiment of the pixel circuit shown in FIG. 5 of the present disclosure, the data voltage Vdata is divided by C1 and C2 and written into the gate electrode of the driving transistor P0, so as to widen the dynamic range of the data voltage Vdata, which is beneficial to the design of the DAC in the source driver and the uniformity of the output of the data line.

Figure 6:
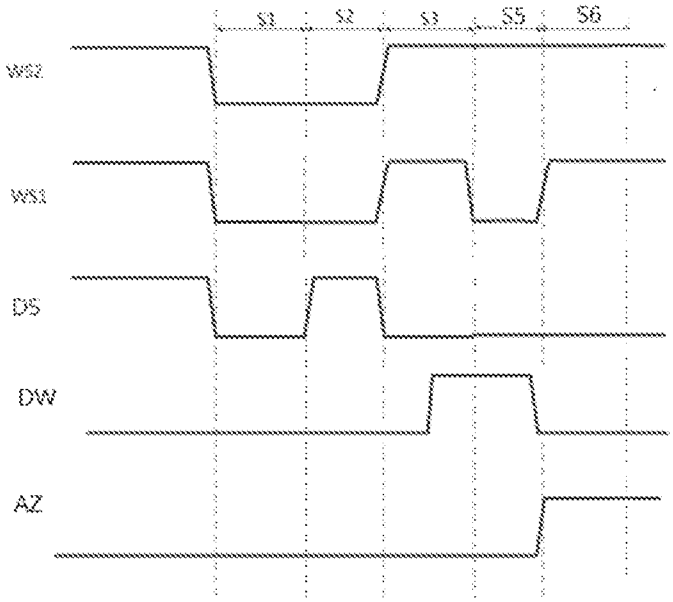
FIG. 6 is a working timing diagram of the pixel circuit shown in FIG. 5 of at least one embodiment of the present disclosure.

As shown in FIG. 6, when at least one embodiment of the pixel circuit shown in FIG. 5 of the present disclosure is working, the display period includes an initialization phase S1, a self-discharge phase S2, a data preparation phase S3, and a data writing-in phase S5 and a light emitting phase S6;

In the initialization phase S1, WS1 provides a low voltage signal, WS2 provides a low voltage signal, DS provides a low voltage signal, AZ provides a low voltage signal, R1 provides a reference voltage Vref, DW provides a reference voltage Vref, P1 and P4 are turned on, and P2 is turned on, P3 is turned on, the source electrode of P0 is connected to the power supply voltage ELVDD, the gate electrode of P0 is connected to the reference voltage Vref, the drain electrode of P0 is connected to the ground terminal G1, and ELVDD-Vref is greater than |Vth|, so that at the beginning of self-discharge phase S2, P0 can be turned on; where, Vth is the threshold voltage of P0 without back gate effect;

In the self-discharge phase S2, AZ provides a low voltage signal, WS1 provides a low voltage signal, WS2 provides a low voltage signal, DS provides a high voltage signal, R1 provides a reference voltage Vref, DW provides a reference voltage Vref, and P4 is turned on, so that the drain electrode of P0 is connected to the ground terminal G1; P3 is turned on, so that the gate electrode of P0 is connected to the reference voltage Vref; P1 is turned on, and P2 is turned off;

At the beginning of the self-discharge phase S2, P0 is turned on and discharged through P0 and P4, so that the source potential Vs of P0 drops, and as Vs drops, a back gate effect occurs, and $|Vth\_ef|$ is equal to $a\times(VDD-Vs)+|Vth|$, where, Vth_ef is the threshold voltage of P0 with back gate effect, a is the coefficient of back gate effect; as Vs decreases, Vgs decreases synchronously, when $|Vth\_ef|$ increases to equal |Vgs|, P0 is turned off and stops discharging; at this time, a×(VDD−Vs)+|Vth|=Vg-Vs;

$$Vs=\frac{Vref-a\times VDD-|Vth|}{1-a};$$

Vg=Vref; wherein Vg is the gate voltage of P0, Vs is the source voltage of P0;

$$|Vgs|=\frac{a\times Vref-a\times VDD-|Vth|}{1-a};$$

In the data preparation phase S3, WS1 provides a high voltage signal, WS2 provides a high voltage signal, DS provides a low voltage signal, AZ provides a low voltage signal, P1 and P3 are turned off, P2 is turned on, P4 is turned on, and the source potential Vs of P0 is pulled up to ELVDD;

In the data preparation phase S3, Vg changes from Vref to $$ELVDD-\frac{a\times Vref-a\times VDD-|Vth|}{1-a};$$

In the data writing-in phase S5, WS1 provides a low voltage signal, WS2 provides a high voltage signal, EM provides a low voltage signal, DW provides data voltage Vdata, AZ provides a low voltage signal, P3 is turned off, P2 is turned on, P4 is turned on, P1 is turned on to write the data voltage Vdata into the gate electrode of P0, b=C2$z$/(C1$z$+C2$z$), wherein C1$z$ is the capacitance value of C1, C2$z$ is the capacitance value of C2; ΔVg is the change value of gate voltage of P0;

$$\Delta Vg=\left(Vdata-ELVDD+\frac{a\times Vref-a\times VDD-|Vth|}{1-a}\right)\times b;$$

$$Vg=ELVDD-\frac{a\times Vref-a\times VDD-|Vth|}{1-a}+\left(Vdata-ELVDD+\frac{a\times Vref-a\times VDD-|Vth|}{1-a}\right)\times b;$$

$$|Vgs|=-b\times Vdata+b\times ELVDD-\frac{(b-1)\times a}{1-a}\times Vref+\frac{(b-1)\times a}{1-a}\times VDD+\frac{(b-1)}{1-a}\times|Vth|;$$

In the light emitting phase S6, WS2 and WS1 provide a high voltage signal, DS provides a low voltage signal, AZ provides a high voltage signal, P3, P1 and P4 are turned off, P2 is turned on, and P0 drives O1 to emit light;

In the light emitting phase S6, $$\begin{aligned}Io1&=K(|Vgs|-|Vth|)^2\\&=K\left(-b\times Vdata+b\times ELVDD-\frac{(b-1)\times a}{1-a}\times Vref+\frac{(b-1)\times a}{1-a}\times VDD+\frac{(b-1)}{1-a}\times|Vth|-|Vth|\right)^2;\end{aligned}$$

It can be seen from the above formula that when (b−1)/(1−a) is equal to 1, Io1 is not related to Vth.

It can be known from the above working process that when at least one embodiment of the pixel circuit shown in FIG. 5 of the present disclosure is in operation, the gate-source voltage of the driving transistor P0 can compensate the threshold voltage of the driving transistor P0 during the light emitting phase, so that the light emitting current of the organic light emitting diode O1 is not related to the threshold voltage Vth, thereby improving display uniformity.

At least one embodiment of the pixel circuit shown in FIG. 5 of the present disclosure is a current-mode pixel circuit using all PMOS transistors, which has a wider anode dynamic range than a current-mode pixel circuit built with NMOS transistors under the same process platform. The reasons are as follows.

For a current-type pixel circuit built with NMOS transistors, when the voltage of the anode of the organic light emitting diode O1 is set to a negative voltage, the negative voltage will be connected to the source or drain electrode of the transistor in the pixel circuit, when the transistor is an n-type transistor, there is a forward-biased diode between the back gate electrode and the source electrode of the transistor, which causes a latch-up effect and makes the pixel circuit work abnormally. Therefore, the current-mode pixel circuit using a PMOS transistor has a wider anode dynamic range, when the transistors in the current-mode pixel circuit are all PMOS transistors, the potential of the anode of the organic light emitting diode O1 may be a negative voltage.

At least one embodiment of the pixel circuit shown in FIG. 5 of the present disclosure adopts a current-type pixel driving method, and the driving transistor included in the driving circuit in at least one embodiment of the pixel circuit shown in FIG. 5 of the present disclosure is a PMOS transistor, when the anode of O1 and the cathode of O1 are short-circuited, the dot-strip-line defect will not occur because the anode voltage of O1 is negative.

At least one embodiment of the pixel circuit shown in FIG. 5 of the present disclosure can prevent the N-type base substrate of the first transistor P1 used to transmit the data voltage from leaking to the drain electrode of the first transistor P1 to the first capacitor C1, thus the low-grayscale bright spot phenomenon occurs for the following reasons.

The transistor used in at least one embodiment of the pixel circuit shown in FIG. 5 of the present disclosure is a PMOS transistor. Therefore, in the non-light emitting phase, even if the N-type substrate of the first transistor P1 leaks current to the drain electrode of the first transistor P1 to the first capacitor C1 to increase the potential of the gate electrode of P0, since the driving transistor P0 is also a PMOS transistor, it will not increase the brightness of the organic light emitting diode, and no bright spots will appear.

In related art, P0 is an NMOS transistor, and the higher the potential of the gate electrode of P0 is, the brighter the organic light emitting diode is. Therefore, in the non-light emitting period, the drain electrode of P1 leaks current to the first capacitor C1, which will increase the potential of the gate electrode of P0, so that the brightness of the organic light emitting diode increases, and bright spots appear. Based on this, at least one embodiment of the present disclosure sets the transistor as a PMOS transistor to solve the above problem.

At least one embodiment of the pixel circuit shown in FIG. 5 of the present disclosure is a current-type pixel circuit, which can compensate for the lifetime attenuation caused by the increase of the internal resistor of the organic light emitting diode O1, and, in the pixel circuit shown in FIG. 5 of the present disclosure, the back gate electrode of each transistor is connected to the high voltage VDD, but not connected to ELVDD, so that the potential of base substrate nwell of each transistor is separated from ELVDD, so that ELVDD can be flexibly set in a range less than VDD.

At least one embodiment of the pixel circuit shown in FIG. 5 of the present disclosure may be a current-type pixel circuit applied to a silicon-based OLED micro-display chip, but it is not limited thereto. At least one embodiment of the present disclosure is based on a specific semiconductor process platform. Only PMOS transistors are used for pixel circuit design, which overcomes the space of MOS transistors limited by the design rule in the pixel circuit where PMOS transistors and NMOS transistors coexist. It can effectively shorten the pixel area and increase Pixels Per Inch (PPI, the number of pixels per inch).

In at least one embodiment of the present disclosure, the fourth transistor may also be an N-type transistor, and in this case, the third voltage terminal may be a reset voltage terminal.

In specific implementation, when the fourth transistor is an NMOS transistor, both the back gate electrode of the fourth transistor and the source electrode of the fourth transistor may be electrically connected to the reset voltage terminal;

A deep n hydrazine is provided between the back gate electrode of the fourth transistor and the P-type substrate to isolate the back gate electrode of the fourth transistor from the P-type base substrate; the base gate electrode and the source electrode of the fourth transistors are all electrically connected to the reset voltage terminal.

In the related art, in the display panel, the back gate electrode of the N-type transistor in the pixel circuit and the back gate electrode of the N-type transistor in the driving circuit (the driving circuit is used to provide the driving signal for the pixel circuit) are both connected to the P type base substrate. However, in at least one embodiment of the present disclosure, the back gate electrode of the fourth transistor in the pixel circuit needs to be electrically connected to the reset voltage terminal, and the P-type base substrate is connected to a 0V voltage signal, so a deep n hydrazine needs to be provided between the P-type base substrate and the back gate electrode of the fourth transistor to isolate the P-type base substrate and the back gate electrode of the fourth transistor.

In at least one embodiment of the present disclosure, the dynamic range of the anode of the organic light emitting diode O1 needs to be extended to negative voltage, the withstand voltage of each transistor is 8V, and ELVDD is 3V, the lowest anode reset voltage can be −5V. Therefore, the back gate electrode of the fourth transistor needs to be connected to a −5V voltage signal (generally, the source electrode of the NMOS transistor and the back gate electrode of the NMOS transistor are electrically connected to the same voltage terminal), so it is necessary to isolate the P-type base substrate from the back gate electrode of the fourth transistor.

Figure 7:
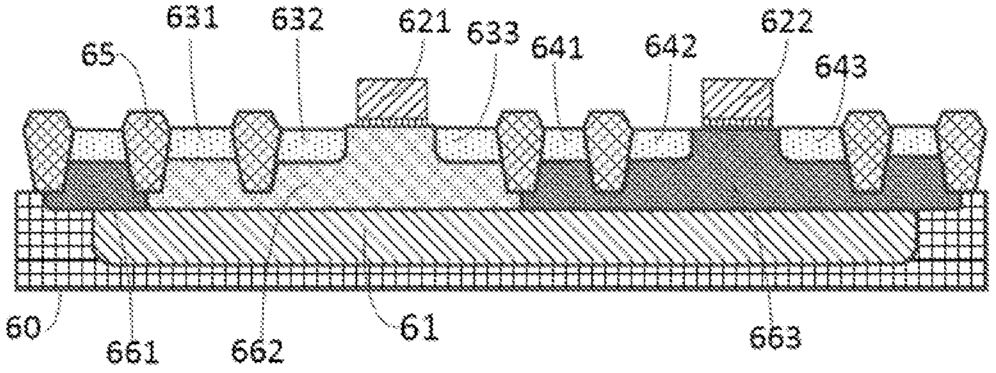
FIG. 7 is a schematic diagram of the structure of an N-type metal-oxide-semiconductor transistor (NMOS transistor) and a P-type metal-oxide-semiconductor transistor (PMOS transistor) in at least one embodiment of the present disclosure.

FIG. 7 is a structural diagram of an NMOS transistor and a PMOS transistor in at least one embodiment of the present disclosure.

In FIG. 7, the one labeled 60 is a P-type base substrate, the one labeled 61 is a deep n hydrazine, the one labeled 621 is a gate electrode of an NMOS transistor, the one labeled 622 is a gate electrode of a PMOS transistor; the one labeled 631 is the back gate electrode of the NMOS transistor, the one labeled 632 is the source electrode of the NMOS transistor, the one labeled 633 is the drain electrode of the NMOS transistor, the one labeled 641 is the back gate electrode of the PMOS transistor, and the one labeled 642 is the source electrode of the PMOS transistor, the one labeled 643 is the drain electrode of the PMOS transistor; the one labeled 65 is an insulating structure; the ones labeled 661 and 663 are an N hydrazine, and the one labeled 662 is a P hydrazine.

In FIG. 7, the NMOS transistor may be the fourth transistor.

As shown in FIG. 7, a deep n hydrazine 61 is provided between the back gate electrode 631 of the NMOS transistor and the P-type base substrate 60, so that the back gate electrode of the NMOS transistor can be connected to a −5V voltage signal, and the P-type base substrate 60 can be connected to 0V voltage signal.

Optionally, the pixel circuit described in at least one embodiment of the present disclosure may further include an n hydrazine; the doping concentration of the n hydrazine is greater than the doping concentration of the deep n hydrazine;

A ratio of a thickness of the n hydrazine to a thickness of the deep n hydrazine is greater than or equal to 0.4 and less than or equal to 0.6; but not limited thereto.

For example, the thickness of the n hydrazine may be 0.5 um, and the thickness of the deep n hydrazine may be 1 um.

In specific implementation, the pixel circuit described in at least one embodiment of the present disclosure may further include a p hydrazine; the ratio of the thickness of the p hydrazine to the thickness of the deep n hydrazine is greater than or equal to 0.4 and less than or equal to 0.6; but not limit.

For example, the thickness of the p hydrazine may be 0.5 um, and the thickness of the deep n hydrazine may be 1 um.

In the related art, there is no deep n-hydrazine between the back gate electrode 631 of the NMOS transistor and the P-type base substrate 60, then the back gate electrode 631 of the NMOS transistor and the P-type base substrate 60 cannot be connected to different voltage signals.

Figure 8:
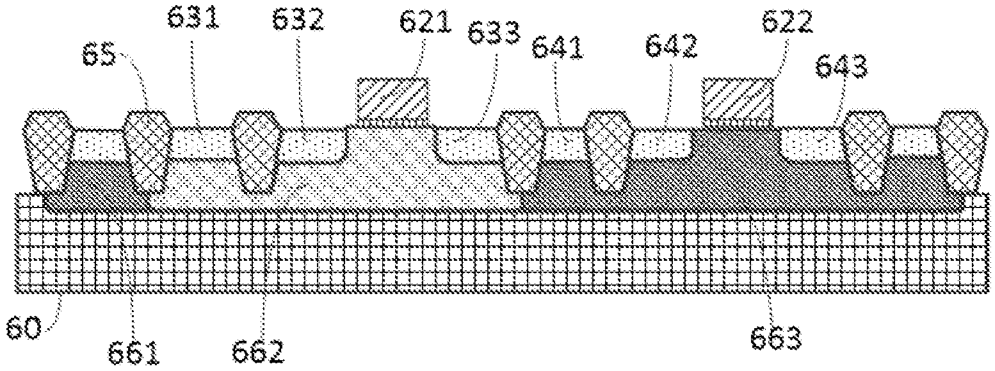
FIG. 8 is a schematic diagram of a structure of an NMOS transistor and a structure of a PMOS in the related art.

FIG. 8 is a schematic structural diagram of an NMOS transistor and a PMOS transistor in the related art.

The difference between FIG. 8 and FIG. 7 is that no deep n hydrazine 61 is provided.

Figure 9:
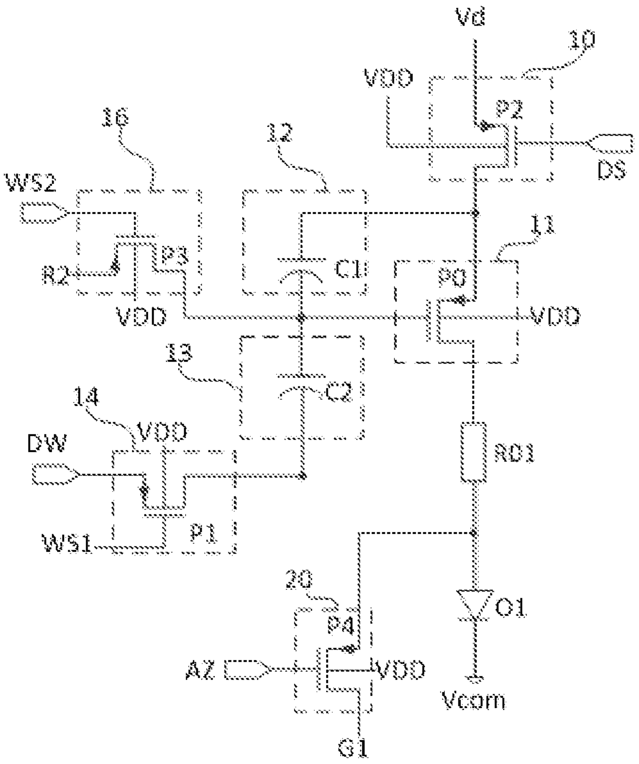
FIG. 9 is a circuit diagram of a pixel circuit according to at least one embodiment of the present disclosure.

As shown in FIG. 9, based on at least one embodiment of the pixel circuit shown in FIG. 5, the pixel circuit described in at least one embodiment of the present disclosure further includes a first resistor R01;

The first resistor R01 is connected between the drain electrode of the driving transistor P0 and the anode of the organic light emitting diode O1;

The first terminal of the first resistor R01 is electrically connected to the drain electrode of the driving transistor P0, and the second terminal of the first resistor R01 is electrically connected to the anode of the organic light emitting diode O1;

The first resistor R01 can prevent a short circuit between the anode of the OLED O1 and the cathode of the OLED O1.

The display panel described in the embodiments of the present disclosure includes a plurality of rows and a plurality of columns of pixel circuits.

The driving method described in the embodiment of the present disclosure is applied to the pixel circuit, and the driving method includes:

Controlling, by the writing-in control circuit, to connect or disconnect the writing-in terminal and the second terminal of the second energy storage circuit under the control of the first writing-in control signal;

Controlling, by the first control circuit, to connect or disconnect the power supply voltage terminal and the first terminal of the driving circuit under the control of the first control signal;

Generating, by the driving circuit, a driving current for driving the light emitting element under the control of a potential of the control terminal of the driving circuit.

Optionally, the display period of the pixel circuit includes an initialization phase, a self-discharge phase, a data preparation phase, a data writing-in phase, and a light emitting phase that are set successively; the driving method described in at least one embodiment of the present disclosure may include:

In the initialization phase, the data preparation phase, the data writing-in phase and the light emitting phase, controlling, by the first control circuit, to connect the power supply voltage terminal and the first terminal of the driving circuit;

In the self-discharging phase, controlling, by the first control circuit, to disconnect the power supply voltage terminal from the first terminal of the driving circuit under the control of the first control signal.

Optionally, the display period of the pixel circuit includes an initialization phase, a self-discharge phase, a data preparation phase, a data writing-in phase, and a light emitting phase that are set successively; the driving method described in at least one embodiment of the present disclosure may include:

In the initialization phase, the data preparation phase, and the light emitting phase, controlling, by the writing-in control circuit, to disconnect the writing-in terminal from the second terminal of the second energy storage circuit under the control of the first writing-in control signal;

In the self-discharging phase and the data writing-in phase, controlling, by the writing-in control circuit, to connect the writing-in terminal and the second terminal of the second energy storage circuit under the control of the first writing-in control signal.

The display device described in at least one embodiment of the present disclosure includes the above-mentioned display panel.

In at least one embodiment of the present disclosure, the display panel includes a first silicon substrate, and a pixel circuit and a gate driving circuit arranged on the first silicon substrate;

The display device further includes a second silicon substrate, and a display driver chip arranged on the second silicon substrate.

Figure 10:
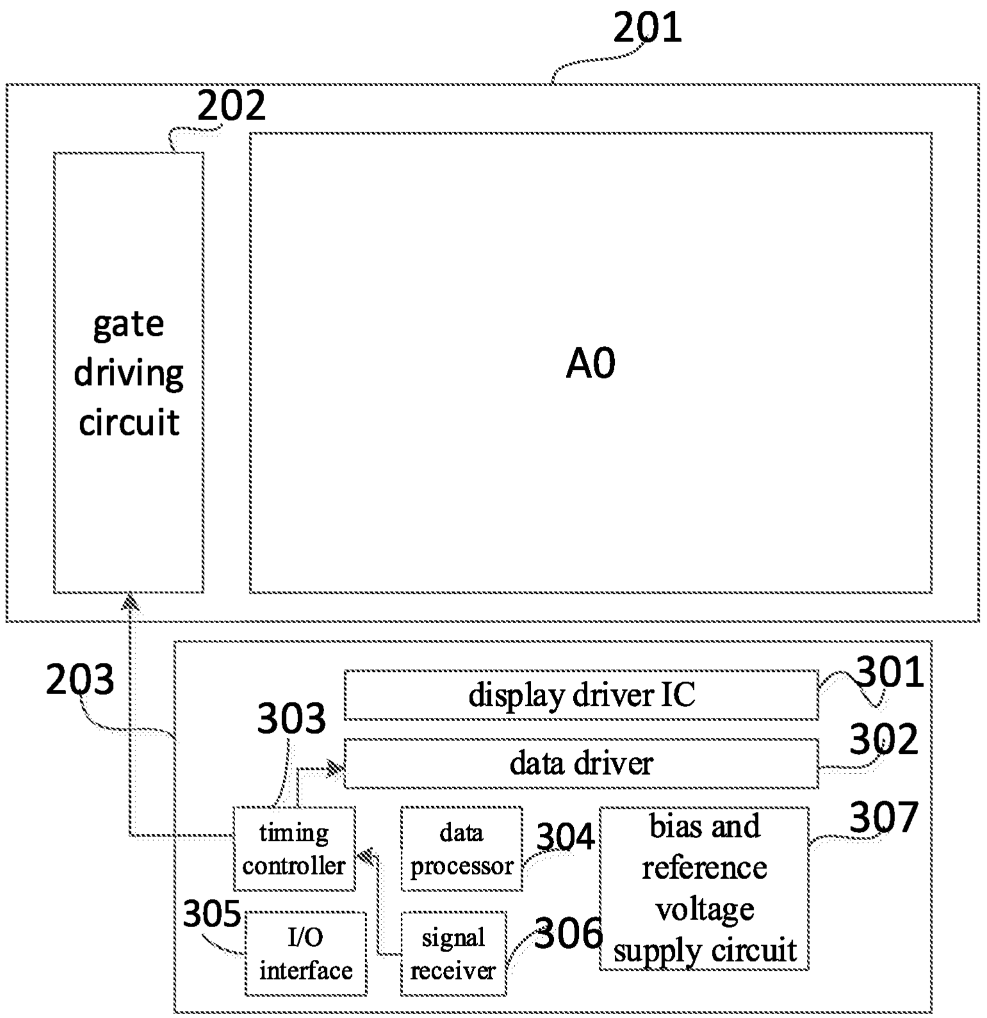
FIG. 10 is a structural diagram of a display device according to at least one embodiment of the present disclosure.

In specific implementation, an area of the first silicon substrate is larger than an area of the second silicon substrate;

A minimum width of the signal lines included in the display panel is greater than a width of the signal lines included in the display driver chip. As shown in FIG. 10, the display panel includes a first silicon substrate 201, and a pixel circuit and a gate driving circuit 202 arranged on the first silicon substrate 201; in FIG. 20, the one labeled A0 is a valid display area, the pixel circuit is arranged in the valid display area;

The display device further includes a second silicon substrate 203 and a display driver chip arranged on the second silicon substrate 203.

In at least one embodiment of the present disclosure, the first transistor included in the pixel circuit, the fourth transistor included in the pixel circuit, and the second capacitor included in the pixel circuit may be arranged outside the valid display area, so the driving transistor included in the pixel circuit, the second transistor included in the pixel circuit, the third transistor included in the pixel circuit, and the second capacitor included in the pixel circuit may be arranged in the valid display area, but not limited thereto.

Optionally, a capacitance value of the first capacitor is greater than a capacitance value of the second capacitor, but not limited thereto.

As shown in FIG. 10, the display driver chip may include a display driver integrated circuit 301, a source driver 302, a timing controller 303, a data processor 304, an input and output interface 305, a signal receiver 306, and a bias and reference voltage supply circuit 307; but not limited thereto.

In at least one embodiment of the present disclosure, the area of the first silicon substrate is larger than the area of the second silicon substrate;

The minimum width of the signal lines included in the display panel is greater than the width of the signal lines included in the display driver chip.

In at least one embodiment of the present disclosure, different processes are used to manufacture the display panel and the display driver chip. For example, the display panel can be manufactured by using a 100 nm process, and the display driver chip can be manufactured by a 28 nm process. In order to make the line width of the signal lines included in the display driver chip smaller than the line width of the signal lines included in the display panel, a distance between signal lines included in the display driver chip is smaller than a distance between signal lines included in the display panel.

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, those skilled in the art may make further modifications and improvements without departing from the spirit of the present disclosure, and these modifications and improvements shall also fall within the scope of the present disclosure.

What is claimed is:

1. A pixel circuit, comprising a light emitting element, a driving circuit, a first energy storage circuit, a second energy storage circuit, a writing-in control circuit and a first control circuit; wherein a first terminal of the first energy storage circuit is electrically connected to a control terminal of the driving circuit, and a second terminal of the first energy storage circuit is electrically connected to a first terminal of the driving circuit; the first energy storage circuit is used to store electrical energy;

a first terminal of the second energy storage circuit is electrically connected to a control terminal of the driving circuit; the second energy storage circuit is used to store electric energy;

the writing-in control circuit is electrically connected to a first writing-in control terminal, a writing-in terminal and a second terminal of the second energy storage circuit respectively, is configured to control the connection or disconnection between the writing-in terminal and the second terminal of the second energy storage circuit under the control of the first writing-in control signal provided by the first writing-in control terminal;

the first control circuit is electrically connected to a first control terminal, a power supply voltage terminal and a first terminal of the driving circuit, and is used to control the connection or disconnection between the power supply voltage terminal and the first terminal of the driving circuit under the control of a first control signal provided by the first control terminal;

a second terminal of the driving circuit is electrically connected to the light emitting element, and the driving circuit is configured to generate a driving current for driving the light emitting element under the control of a potential of the control terminal of the driving circuit;

wherein the first control circuit is configured to control the connection between the power supply voltage terminal and the first terminals of the driving circuit in two discontinuous phases in one display period under the control of the first control signal.

2. The pixel circuit according to claim 1, wherein a display period of the pixel circuit may include an initialization phase, a self-discharge phase, a data preparation phase, a data writing-in phase, and a light emitting phase that are set successively;

the first control circuit is configured to control the connection between the power supply voltage terminal and the first terminal of the driving circuit in the initialization phase, the data preparation phase, the data writing-in phase and the light emitting phase, control to disconnect the power supply voltage terminal from the first terminal of the driving circuit in the self-discharging phase under the control of the first control signal.

3. The pixel circuit according to claim 2, wherein the writing-in control circuit is configured to control to disconnect the writing-in terminal from the second terminal of the second energy storage circuit in the initialization phase, the data preparation phase and the light emitting phase under the control of the first writing-in control signal, control to connect the writing-in terminal and the second terminal of the second energy storage in the self-discharging phase and the data writing-in phase under the control of the first writing-in control signal.

4. The pixel circuit according to claim 1, further comprising a reference voltage writing-in circuit; wherein the reference voltage writing-in circuit is electrically connected to a second writing-in control terminal, a reference voltage terminal and the control terminal of the driving circuit respectively, and is configured to write a reference voltage provided by the reference voltage terminal into the control terminal of the driving circuit under the control of a second writing-in control signal provided by the second writing-in control terminal.

5. The pixel circuit according to claim 1, further comprising a second control circuit; wherein the second terminal of the driving circuit is electrically connected to the first electrode of the light emitting element, and the second electrode of the light emitting element is electrically connected to the first voltage terminal;

the second control circuit is electrically connected to a second control terminal, a reset voltage terminal and the first electrode of the light emitting element, and is configured to control to write a reset voltage provided by the reset voltage terminal into the first electrode of the light emitting element under the control of a second control signal provided by the second control terminal.

6. The pixel circuit according to claim 1, further comprising a resistor circuit; wherein the second terminal of the driving circuit is electrically connected to the first electrode of the light emitting element through the resistor circuit, the second electrode of the light emitting element is electrically connected to the first voltage terminal.

7. The pixel circuit according to claim 1, wherein the first energy storage circuit comprises a first capacitor; the second energy storage circuit comprises a second capacitor; the writing-in control circuit includes a first transistor;

a first terminal of the first capacitor is electrically connected to the control terminal of the driving circuit, and a second terminal of the first capacitor is electrically connected to the first terminal of the driving circuit;

a first terminal of the second capacitor is electrically connected to the control terminal of the driving circuit;

a control electrode of the first transistor is electrically connected to the first writing-in control terminal, a first electrode of the first transistor is electrically connected to the writing-in terminal, and a second electrode of the first transistor is electrically connected to the second terminal of the second capacitor; a back gate electrode of the first transistor is electrically connected to the second voltage terminal.

8. The pixel circuit according to claim 1, wherein the first control circuit comprises a second transistor; the driving circuit comprises a driving transistor;

a control electrode of the second transistor is electrically connected to the first control terminal, a first electrode of the second transistor is electrically connected to the power supply voltage terminal, and a second electrode of the second transistor is electrically connected to the first terminal of the driving transistor; a back gate electrode of the second transistor is electrically connected to the second voltage terminal;

a control electrode of the driving transistor is the control terminal of the driving circuit, a first electrode of the driving transistor is the first terminal of the driving circuit, and a second electrode of the driving transistor is the second terminal of the driving circuit; a back gate electrode of the driving transistor is electrically connected to the second voltage terminal.

9. The pixel circuit according to claim 4, wherein the reference voltage writing-in circuit comprises a third transistor;

a control electrode of the third transistor is electrically connected to the second writing-in control terminal, a first electrode of the third transistor is electrically connected to the reference voltage terminal, and a second electrode of the third transistor is electrically connected to the control terminal of the driving circuit; a back gate electrode of the third transistor is electrically connected to the second voltage terminal.

10. The pixel circuit according to claim 5, wherein the second control circuit comprises a fourth transistor;

a control electrode of the fourth transistor is electrically connected to the second control terminal, a first electrode of the fourth transistor is electrically connected to the reset voltage terminal, and a second electrode of the fourth transistor is electrically connected to the first electrode of the light emitting element; a back gate electrode of the fourth transistor is electrically connected to a third voltage terminal.

11. The pixel circuit according to claim 10, wherein the fourth transistor is an n-type transistor, and the third voltage terminal is the reset voltage terminal; or, the fourth transistor is a p-type transistor, and the third voltage terminal is the second voltage terminal.

12. The pixel circuit according to claim 11, wherein the fourth transistor is an n-type transistor; a deep n hydrazine is provided between the back gate electrode of the fourth transistor and a P-type substrate to isolate the back gate electrode of the fourth transistor from the P-type base substrate; the base gate electrode and the first electrode of the fourth transistors are all electrically connected to the reset voltage terminal.

13. The pixel circuit according to claim 12, further comprising an n hydrazine and a p hydrazine; wherein a doping concentration of the n hydrazine is greater than a doping concentration of the deep n hydrazine;

a ratio of a thickness of the n hydrazine to a thickness of the deep n hydrazine is greater than or equal to 0.4 and less than or equal to 0.6;

a ratio of a thickness of the p hydrazine to the thickness of the deep n hydrazine is greater than or equal to 0.4 and less than or equal to 0.6.

14. A display panel comprising a plurality of rows and a plurality of columns of the pixel circuits according to claim 1.

15. A driving method applied to the pixel circuit according to claim 1, wherein the driving method comprises:

controlling, by the writing-in control circuit, to connect or disconnect the writing-in terminal and the second terminal of the second energy storage circuit under the control of the first writing-in control signal;

controlling, by the first control circuit, to connect or disconnect the power supply voltage terminal and the first terminal of the driving circuit under the control of the first control signal;

generating, by the driving circuit, a driving current for driving the light emitting element under the control of a potential of the control terminal of the driving circuit;

wherein the driving method comprises:

in one display period, in two discontinuous phases, controlling, by the first control circuit, to connect the power supply voltage terminal and the first terminal of the driving circuit under the control of the first control signal.

16. The driving method according to claim 15, wherein the display period of the pixel circuit includes an initialization phase, a self-discharge phase, a data preparation phase, a data writing-in phase, and a light emitting phase that are set successively; the driving method comprises:

in the initialization phase, the data preparation phase, the data writing-in phase and the light emitting phase, controlling, by the first control circuit, to connect the power supply voltage terminal and the first terminal of the driving circuit under the control of the first control signal;

in the self-discharging phase, controlling, by the first control circuit, to disconnect the power supply voltage terminal from the first terminal of the driving circuit under the control of the first control signal.

17. The driving method according to claim 15, wherein the display period of the pixel circuit includes an initialization phase, a self-discharge phase, a data preparation phase, a data writing-in phase, and a light emitting phase that are set successively; the driving method includes:

in the initialization phase, the data preparation phase, and the light emitting phase, controlling, by the writing-in control circuit, to disconnect the writing-in terminal from the second terminal of the second energy storage circuit under the control of the first writing-in control signal;

in the self-discharging phase and the data writing-in phase, controlling, by the writing-in control circuit, to connect the writing-in terminal and the second terminal of the second energy storage circuit under the control of the first writing-in control signal.

18. A display device comprising the display panel according to claim 14, wherein the display panel comprises a first silicon substrate, and the pixel circuit and a gate driving circuit arranged on the first silicon substrate;

the display device further includes a second silicon substrate, and a display driver chip arranged on the second silicon substrate;

wherein an area of the first silicon substrate is larger than an area of the second silicon substrate;

a minimum width of a signal line included in the display panel is greater than a width of a signal line included in the display driver chip.

* * * * *